United States Patent
Liu et al.

(10) Patent No.: US 10,252,608 B2
(45) Date of Patent: Apr. 9, 2019

(54) TRANSMISSION UNIT, POWER TRANSMISSION SYSTEM AND VEHICLE COMPRISING THE SAME

(71) Applicant: BYD COMPANY LIMITED, Shenzhen, Guangdong (CN)

(72) Inventors: Jing Liu, Shenzhen (CN); Yu Hua, Shenzhen (CN)

(73) Assignee: BYD Company Limited, Shenzhen, Guangdong (CN)

( * ) Notice: Subject to any disclaimer, the term of this patent is extended or adjusted under 35 U.S.C. 154(b) by 74 days.

(21) Appl. No.: 15/648,864

(22) Filed: Jul. 13, 2017

(65) Prior Publication Data
US 2017/0305258 A1 Oct. 26, 2017

Related U.S. Application Data

(63) Continuation of application No. PCT/CN2015/082955, filed on Jun. 30, 2015.

(30) Foreign Application Priority Data

Jan. 16, 2015 (CN) .......................... 2015 1 0024072

(51) Int. Cl.
*B60K 6/48* (2007.10)
*B60K 6/36* (2007.10)
(Continued)

(52) U.S. Cl.
CPC .................. *B60K 6/48* (2013.01); *B60K 1/02* (2013.01); *B60K 6/26* (2013.01); *B60K 6/36* (2013.01);
(Continued)

(58) Field of Classification Search
None
See application file for complete search history.

(56) References Cited

U.S. PATENT DOCUMENTS 7,249,537 B2 * 7/2007 Lee .......................... B60K 6/36
74/661
8,931,371 B2 * 1/2015 Xie .......................... B60K 6/48
74/665 A
(Continued)

FOREIGN PATENT DOCUMENTS

CN 103029558 A 4/2013
CN 103921674 A 7/2014
(Continued)

OTHER PUBLICATIONS

International Search Report and Written Opinion for Application No. PCT/CN2015/082955, dated Oct. 29, 2015, 6 pages.

*Primary Examiner* — Dirk Wright
(74) *Attorney, Agent, or Firm* — Sheppard, Mullin, Richter & Hampton LLP

(57) ABSTRACT

A transmission unit includes: input shafts, each of the input shafts being provided with a shift driving gear thereon; output shafts, each of the output shafts being provided with a shift driven gear configured to mesh with a corresponding shift driving gear; a generator gear disposed on one of the output shafts; a motor power shaft; a first motor power shaft gear disposed on the motor power shaft and configured to rotate together with the generator gear; a second motor power shaft gear disposed on the motor power shaft and configured to rotate together with a shift driven gear; a reverse idler gear; and a reverse output gear configured to rotate together with a shift driving gear via the reverse idler gear. A power transmission system including the transmission unit and a vehicle including the power transmission system are also provided.

24 Claims, 6 Drawing Sheets

(51) Int. Cl.

| | | |
|---|---|---|
| *F16H 3/00* | (2006.01) | |
| *B60K 6/26* | (2007.10) | |
| *B60K 6/365* | (2007.10) | |
| *B60K 6/40* | (2007.10) | |
| *B60K 6/52* | (2007.10) | |
| *B60K 6/547* | (2007.10) | |
| *F16H 3/085* | (2006.01) | |
| *F16H 3/091* | (2006.01) | |
| *F16H 37/08* | (2006.01) | |
| *F16H 48/36* | (2012.01) | |
| *B60K 1/02* | (2006.01) | |
| *B60K 6/387* | (2007.10) | |
| *B60K 7/00* | (2006.01) | |
| *F16H 3/08* | (2006.01) | |
| *F16H 3/093* | (2006.01) | |

(52) U.S. Cl.
CPC .............. *B60K 6/365* (2013.01); *B60K 6/387* (2013.01); *B60K 6/40* (2013.01); *B60K 6/52* (2013.01); *B60K 6/547* (2013.01); *B60K 7/0007* (2013.01); *F16H 3/006* (2013.01); *F16H 3/085* (2013.01); *F16H 3/091* (2013.01); *F16H 37/0806* (2013.01); *F16H 48/36* (2013.01); *B60K 2006/4808* (2013.01); *B60K 2006/4816* (2013.01); *B60K 2007/0038* (2013.01); *B60K 2007/0046* (2013.01); *B60K 2007/0061* (2013.01); *B60K 2007/0092* (2013.01); *B60Y 2200/92* (2013.01); *F16H 2003/0822* (2013.01); *F16H 2003/0931* (2013.01); *F16H 2048/364* (2013.01); *Y02T 10/6221* (2013.01); *Y02T 10/6256* (2013.01); *Y02T 10/6265* (2013.01); *Y10S 903/906* (2013.01); *Y10S 903/91* (2013.01); *Y10S 903/916* (2013.01); *Y10S 903/919* (2013.01); *Y10S 903/951* (2013.01)

(56) References Cited

U.S. PATENT DOCUMENTS

| | | | |
|---|---|---|---|
| 9,341,239 B2 * | 5/2016 | Lee | ............ F16H 3/08 |
| 2014/0144288 A1 | 5/2014 | Glueckler et al. | |
| 2017/0305257 A1 * | 10/2017 | Ruan | ............ B60K 6/547 |

FOREIGN PATENT DOCUMENTS

| | | | | |
|---|---|---|---|---|
| DE | 102012222122 A1 * | 6/2014 | ............ | B60K 6/547 |
| DE | 102012222125 A1 * | 6/2014 | ............ | B60K 6/547 |
| DE | 102012222681 A1 * | 6/2014 | ............ | B60K 6/547 |
| DE | 102012222682 A1 * | 6/2014 | ............ | B60K 6/547 |
| EP | 3360742 A1 * | 8/2018 | ............ | B60K 6/387 |
| WO | WO-2015060329 A1 * | 4/2015 | ............ | B60K 6/36 |
| WO | WO-2017158156 A1 * | 9/2017 | ............ | B60K 6/383 |

* cited by examiner ional Application No. PCT/CN2015/082955, filed on Jun. 30, 2015, which is based on and claims priority to and benefits of Chinese Patent Application No. 201510024072.4, filed with the State Intellectual Property Office (SIPO) of the People's Republic of China on Jan. 16, 2015. The entire contents of the above-identified applications are incorporated herein by reference.

TRANSMISSION UNIT, POWER TRANSMISSION SYSTEM AND VEHICLE COMPRISING THE SAME

CROSS-REFERENCE TO RELATED APPLICATIONS

This application is a continuation application of International Application No. PCT/CN2015/082955, filed on Jun. 30, 2015, which is based on and claims priority to and benefits of Chinese Patent Application No. 201510024072.4, filed with the State Intellectual Property Office (SIPO) of the People's Republic of China on Jan. 16, 2015. The entire contents of the above-identified applications are incorporated herein by reference.

FIELD

Embodiments of the present disclosure relate to vehicles, and more particularly to a transmission unit, a power transmission system including the transmission unit, and a vehicle including the power transmission system.

BACKGROUND

To reduce energy consumption, the development and utilization of energy-efficient vehicles have become a trend. As an energy-efficient vehicle, a hybrid vehicle is driven by at least one of an internal combustion engine and a motor and has various operation modes, and consequently may operate with improved transmission efficiency and fuel efficiency.

However, in the related art, the power transmission system in the hybrid vehicle is generally complex in structure, provides fewer transmission modes, and is low in transmission efficiency. Besides, for most hybrid vehicles, the charging process is always carried out during the running of the vehicle. Therefore, a conventional hybrid vehicle has relatively fewer charging modes and charging passage, and lower charging efficiency.

SUMMARY

Embodiments of the present disclosure seek to solve at least one of the problems existing in the prior art to at least some extent.

Embodiments of a first broad aspect of the present disclosure provide a transmission unit. The transmission unit according to embodiments of the present disclosure includes: a plurality of input shafts, each of the input shafts being provided with a shift driving gear thereon; a plurality of output shafts, each of the output shafts being provided with a shift driven gear configured to mesh with a corresponding shift driving gear; a generator gear disposed on one of the output shafts; a motor power shaft; a first motor power shaft gear disposed on the motor power shaft configured to rotate together with the generator gear; a second motor power shaft gear disposed on the motor power shaft configured to rotate together with a shift driven gear; and a reverse output gear configured to rotate together with a shift driving gear via a reverse idler gear.

Embodiments of a second broad aspect of the present disclosure provide a power transmission system including the transmission unit. The power transmission system including the transmission unit according to embodiments of the present disclosure includes the above-identified transmission unit and a first motor generator configured to rotate together with the motor power shaft.

Embodiments of a third broad aspect of the present disclosure provide a vehicle. The vehicle according to embodiments of the present disclosure includes the above-identified power transmission system.

With the power transmission unit and the power transmission system according to embodiments of the present disclosure, the transmission modes are increased, and various conditions, such as charging the vehicle while parking or charging the vehicle while driving, may be accomplished.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
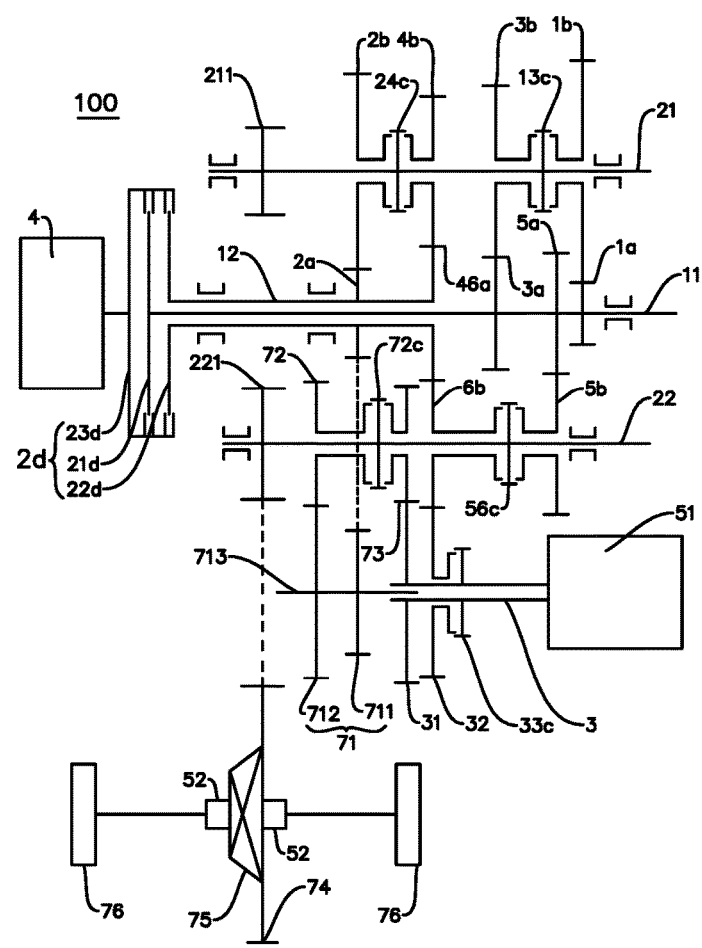
FIG. 1 is a schematic view of an exemplary power transmission system according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, it should be understood that, the terms such as "central", "longitudinal", "lateral", "width", "thickness", "above", "below", "front", "rear", "right", "left", "vertical", "horizontal", "top", "bottom", "inner", "outer", "clockwise", "counter-clockwise" should be construed to refer to the orientation as then described or as shown in the drawings. These terms are merely for convenience and concision of description and do not alone indicate or imply that the device or element referred to must have a particular orientation. Thus, it cannot be understood to limit the present disclosure.

In addition, terms such as "first" and "second" are used herein for purposes of description and are not intended to indicate or imply relative importance or significance or impliedly indicate quantity of the technical feature referred to. Thus, the feature defined with "first" and "second" may comprise one or more this feature. In the description of the present disclosure, "a plurality of" means two or more than two features, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; and may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature. A first feature "below," "under," or "on bottom of" a second feature may include an embodiment in which the first feature is right or obliquely "below," "under," or "on bottom of" the second feature, or just means that the first feature is at a distance lower than that of the second feature.

A power transmission system according to embodiments of the present disclosure may be described below with reference to FIGS. 1-5. The power transmission system according to embodiments of the present disclosure may be used in vehicles such as hybrid vehicles as a power system, which may provide sufficient power and electric power for driving the vehicle.

Figure 6:
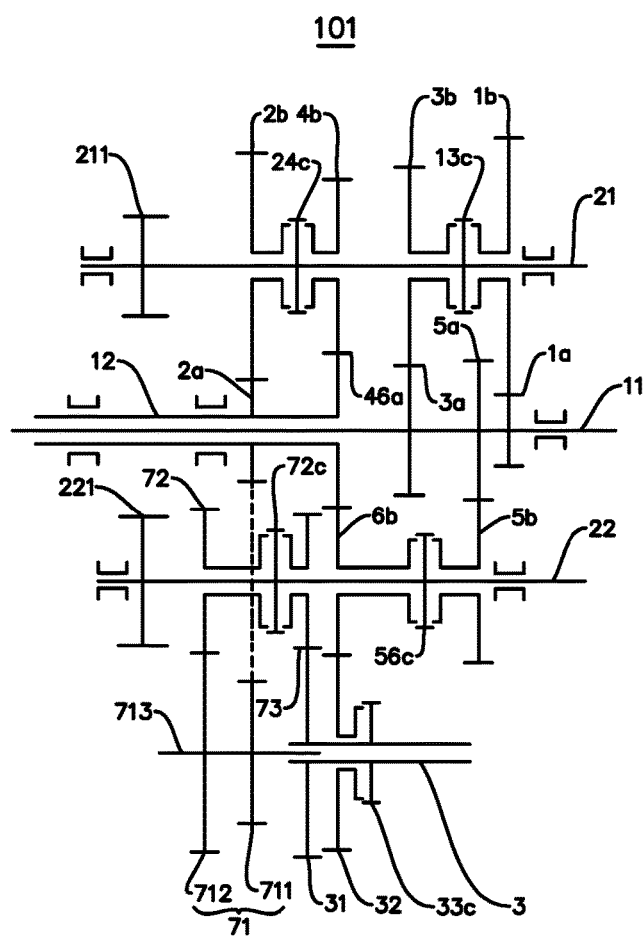
FIG. 6 is a schematic view of an exemplary power transmission unit of a power transmission system according to an embodiment of the present disclosure.

In some embodiments, a power transmission system 100 may generally include a power unit and a transmission unit. The power unit may be an engine 4, a motor generator, and so on. In some embodiments, the transmission unit 101 as shown in FIG. 6 may transmit power output from the power unit, thus driving or charging the vehicle.

In some embodiments, as shown in FIGS. 1-5, the power transmission system 100 may include, but is not limited to, an engine 4, a first motor generator 51, and a transmission unit 101.

In some embodiments as shown in, for example, FIG. 1, the transmission unit 101 includes a plurality of input shafts (e.g. a first input shaft 11, a second input shaft 12), a plurality of output shafts (e.g. a first output shaft 21, a second output shaft 22), a motor power shaft 3, a plurality of gears provided on related shafts (such as the input shaft, the output shaft, and the motor power shaft), and a gear shift member such as a synchronizer.

In some embodiments, the engine 4 is configured to selectively engage with at least one of the input shafts, when the engine 4 performs power transmission with the input shaft(s). For example, when the engine 4 is transmitting power to the input shaft, the engine 4 may selectively engage with one of the input shafts to transmit power. In some embodiments, the engine 4 may selectively engage with two or more of the input shafts simultaneously to transmit power.

In some embodiments, as shown in FIGS. 1-5, the plurality of input shafts include a first input shaft 11 and a second input shaft 12. The engine 4 may selectively engage with one of the first and second input shafts 11, 12 to transmit power. In some embodiments, the engine 4 may engage with the first and second input shafts 11, 12 simultaneously to transmit power. It should be noted that the engine 4 may be disengaged from the first and second input shafts 11, 12 simultaneously.

In some embodiments, the engagement between the engine 4 and the input shaft(s) is related to specific conditions of the power transmission system 100. The engagement between the engine 4 and the input shaft(s) will be described below in detail with reference to detailed embodiments.

In some embodiments, the power transmission between the input shaft(s) and the output shaft(s) is achieved by shaft gear pairs. For example, each of the input shafts has a shaft driving gear provided thereon, and each of the output shafts has a shaft driven gear provided thereon. Thus a plurality of gear pairs with different velocity ratio are formed by meshing of corresponding shaft driving gears and shaft driven gears.

In some embodiments, the transmission unit may be a six-speed transmission, i.e. the transmission unit may include a first-gear gear pair, a second-gear gear pair, a third-gear gear pair, a fourth-gear gear pair, a fifth-gear gear pair, and a sixth-gear gear pair. There are no particular limits in the present disclosure, and a person skilled in the art may increase or reduce the number of gear pairs accordingly based on transmission requirements. The transmission unit may not be limited to the six-speed transmission as disclosed in the present embodiment.

In some embodiments, as shown in FIGS. 1-6, a generator gear 73 is disposed on one of the output shafts, such as the second output shaft 22, which may not be construed as a limitation.

In some embodiments, a first motor power shaft gear 31 may be disposed on the motor power shaft 3 and configured to rotate with the generator gear 73, such as the first motor power shaft gear 31 that may be configured to mesh with the generator gear 73 directly. In some embodiments, a second motor power shaft gear 32 may be disposed on the motor power shaft 3 and configured to rotate with a shift driven gear, such as the motor power shaft gear 32 that may be configured to mesh with six-gear shift driven gear 6b directly.

In some specification of the present disclosure, the expression "rotate together with" means that related components (such as two components) may rotate together. In an embodiment that one component rotates together with the other one component, when the one component rotates, the other one component rotates together.

In some embodiments that a gear rotates together with a shaft, when the gear rotates, the relative shaft rotates together; alternatively, when the shaft rotates, the relative gear rotates together.

In some embodiments that one shaft rotates together with the other shaft, when one shaft rotates, the other shaft rotates together.

In some embodiments that one gear rotate together with the other one gear, when the one gear rotates, the other one gear rotates together.

In the following description, the expression "rotate together with" may be understood as described above, unless specified or limited otherwise.

In the specification of the present disclosure, a motor generator (such as the first motor generator 51) may be understood as an apparatus which can function as a motor and a generator, unless specified or limited otherwise.

In some embodiments, the second motor power shaft gear 32 may rotate with a shift driven gear, such that the first motor generator 51 may use at least a part of power generated by the engine to generate electric power when the vehicle is in a running or a parking state.

In some embodiments, when the vehicle is in a running state, the engine 4 may transmit power to the first motor generator 51 via a shift driven gear, the second motor power shaft gear 32 and the motor power shaft 3, so as to drive the first motor generator to generate electric power, thus accomplishing a condition of charging the vehicle battery while driving the vehicle. In some embodiments, when the vehicle is in a parking state (e.g., the vehicle stops running but the engine is still working), at least a part of power generated by the engine 4 may be transmitted to the first generator 51 via a shift driven gear, the second motor power shaft gear 32 and the motor power shaft 3 so as to drive the first motor generator 51 to generate electric power, thus accomplishing a condition of charging the vehicle while parking (such as charging the vehicle while the vehicle is not running).

In some embodiments, the motor power shaft 3 may be a motor shaft of the first motor generator 51. In some embodiments, the motor power shaft 3 may be a shaft different from the motor shaft of the first motor generator 51.

With the power transmission system 100 according to embodiments of the present disclosure, the number of charging modes of the vehicle can be increased. For example, the charging of a vehicle battery can take place either when the vehicle is running or when the vehicle is parked. Therefore, different charging modes can be provided, and charging efficiency can be improved.

The detailed configuration of the transmission unit 101 may be described in detail below with reference to detailed embodiments as shown in FIGS. 1-6.

A reverse unit of the power transmission system 100 according to embodiments of the present disclosure may be described below in detail. In some embodiments, the reverse unit includes a reverse output gear 72 and a reverse idler gear 71. The reverse output gear may rotate together with a shift driving gear via the reverse idler gear 71. In some embodiments, the reverse output gear 72 may rotate together with a second-gear shift driving gear 2a. The power generated by the engine 4 and/or the power generated by the first motor generator 51 may be transmitted to the reverse output gear 72 so as to be output.

In some embodiments, the reverse output gear 72 may fit over one of the output shafts. In other words, the reverse output gear 72 and the generator gear 73 are disposed on the same output shaft. Such that a synchronizer is needed to engage with the reverse output gear 72 and the corresponding output shaft. In some embodiments, the reverse synchronizer 72c may be disposed on one of the output shafts and at least configured to engage with the reverse output gear 72. In other words, the reverse synchronizer 72c is disposed on an output shaft with the reverse output gear 72 and is at least configured to engage with the reverse output gear 72. In some embodiments, the reverse synchronizer may engage with other gears fitted over the output shaft, such as the generator gear 73, which may not be construed as a limitation.

In some embodiments, as shown in FIGS. 1-5, when the reverse synchronizer 72c is configured to engage with the reverse output gear 72, the reverse output gear 72 and the output shaft may rotate at the same direction and the same velocity. When the reverse synchronizer 72 is in a disengaged state, the reverse output gear 72 and the output shaft may rotate at different speeds.

In some embodiments, the reverse idler gear 71 may include the first reverse idler gear 711 and the second reverse idler gear 712, which may not be construed a limitation. As shown in FIG. 1, the first reverse idler gear 711 may be configured to mesh with a shift driving gear. Specifically, the first reverse idler gear 711 is configured to mesh with the shift driving gear rotating together with reverse output gear 72. The second reverse idler gear 712 may mesh with the reverse output gear 72. The first reverse idler gear 711 and the second reverse idler gear 712 may be configured to rotate simultaneously, specifically, may rotate at the same direction and the same velocity.

With a reasonable designing of the number of teeth of the first reverse idler gear 711 and the second reverse idler gear 712, a better reverse velocity ratio can be obtained, thus accomplishing more revering requirements.

In some embodiments, the first reverse idler gear 711 and the second reverse idler gear 712 may be fixed on the reverse shaft 713. The reverse shaft 713 may be solid and the motor power shaft 3 may be hollow. A part of the reverse shaft 713 may be inserted within the motor power shaft 3. The reverse shaft 713 and the motor power shaft 3 may be arranged coaxially. Therefore, the axial size of the transmission unit 101 may be reduced, and the transmission unit 101 can have a more compact and reasonable structure.

The detailed configuration of the first motor power shaft gear 31, the second motor power shaft gear 32 and the corresponding mechanism rotating together may be described in detail below with reference to detailed embodiments.

In some embodiments, the first motor power shaft gear 31 may be fixed on the motor power shaft 3. In some embodiments, the generator gear 73 may be fitted over one of the output shafts and meshed with first motor power shaft gear 31 directly.

In some embodiments, a generator gear synchronizer may be configured to synchronize the generator gear 73 and the corresponding output shaft, such that power generated by the first motor generator 51 can be transmitted to the generator gear 73 so as to be output. In some embodiments, as shown in FIGS. 1-6, the generator gear synchronizer is a reverse synchronizer 72c. The reverse synchronizer 72c may be disposed on one of the output shafts and be engaged with the generator gear 73. Specifically, the generator gear synchronizer is disposed on an output shaft with the generator gear 73 and configured to make the generator gear 73 fitted over the output shaft engage with the output shaft, such that the generator gear 73 can rotate with the output shaft simultaneously.

In some embodiments, the reverse output gear 72 and the generator gear 73 are both fitted over the same output shaft. The generator gear 73 and reverse output gear 72 may share a reverse synchronizer 72c, such that the reverse synchronizer 72c can form a generator gear synchronizer.

In some embodiments, as shown in FIGS. 1-5, the engaging sleeve of the reverse synchronizer 72c may move to the left side to engage with the reverse output gear 72 and move to the right side to engage with the generator gear 73.

Therefore, the number of the synchronizers can be saved via an engaged state of the reverse output gear 72 and the generator gear 73 with the corresponding output shaft controlled by a synchronizer. At the same time, the transmission unit 101 may have a more compact structure so as to be arranged on a vehicle more conveniently.

In some embodiments, the second motor power shaft gear 32 may be fitter over the motor power shaft 3. A motor power shaft synchronizer 33c may be disposed on the motor power shaft 3 and configured to engage with the second motor power shaft gear 32. Such that power generated by the first motor generator 51 may be transmitted to the six-gear shift driven gear 6b that rotates together with the second motor power shaft gear 32 via a synchronization of the motor power shaft synchronizer 33c with the second motor power shaft gear 32. In some embodiments, power from the corresponding shift driven gear may be transmitted to the first motor generator 51 via a synchronization of the motor power shaft synchronizer 33c with the second motor power shaft gear 32, thus driving the first motor generator to generate the electric power.

The input shaft(s), the output shaft(s), the shift driving gears and the shift driven gears of the power transmission system 100 will be described below with reference to embodiments shown in FIGS. 1-6.

In some embodiments, as shown in FIGS. 1-6, two input shafts are provided. In the present embodiment, the plurality of input shafts includes a first input shaft 11 and a second input shaft 12. The second input shaft 12 may be hollow and the first input shaft 11 may be solid. One part of the first input shaft 11 may be inserted within the hollow second input shaft 12, and the other part of the first input shaft 11 may extend out of the second input shaft 12 along an axial direction of the second input shaft 12. The first input shaft 11 and the second input shaft 12 may be arranged coaxially.

In some embodiments, two output shafts are provided. In the present embodiment, the plurality of output shafts may include a first output shaft 21 and a second output shaft 22. The first output shaft 21 and the second output shaft 22 may be arranged coaxially with the input shafts (such as the first input shaft 11 and the second input shaft 12). Both the first output shaft 21 and the second output shaft 22 may be solid.

In some embodiments, the power transmission system 100 according to embodiments of the present disclosure may have six gear transmission types. Specifically, odd-numbered gear shift driving gears may be arranged on the first input shaft 11, while even-numbered gear shift driving gear may be arranged on the second input shaft 12. The first input shaft 11 may transmit power from gear pairs of odd-numbered gears, and the second input shaft 12 may transmit power from gear pairs of even-numbered gears.

In some embodiments, as shown in FIGS. 1-5, a first-gear shift driving gear 1a, a third-gear shift driving gear 3a and a fifth-gear shift driving gear 5a may be arranged on the first input shaft 11, and a second-gear shift driving gear 2a, and a fourth-sixth-gear shift driving gear 46a may be arranged on the second input shaft 12. Each of the first-gear to fourth-sixth-gear shift driving gears 1a, 2a, 3a, 46a, and 5a may rotate together with a corresponding input shaft.

In some embodiments, a first-gear shift driven gear 1b, a second-gear shift driven gear 2b, a third-gear shift driven gear 3b and a fourth-gear shift driven gear 4b may be disposed on the first output shaft 21, and a fifth-gear shift driven gear 5b and a sixth-gear shift driven 6b may be disposed on the second output shaft 22. Each of the shift driven gears 1b, 2b, 3b, 4b, 5b and 6b may be fitted over a corresponding output shaft. Each of the shift driven gears and the corresponding output shafts thereof may rotate at different speeds.

In some embodiments, the first-gear shift driving gear 1a may mesh with the first-gear shift driven gear 1b to form one gear pair, the second-gear shift driving gear 2a may mesh with the second-gear shift driven gear 2b to form one gear pair, the third-gear shift driving gear 3a may mesh with the third-gear shift driven gear 3b to form one gear pair, the fourth-sixth-gear shift driving gear 46a may mesh with the fourth-gear shift driven gear 4b to form one gear pair, the fifth-gear shift driving gear 5a may mesh with the fifth-gear shift driven gear 5b to form one gear pair, and the fourth-sixth-gear shift driving gear 46a may mesh with the sixth-gear shift driven gear 6b to form one gear pair and six pairs of gear pairs can be formed.

In the present embodiment, the fourth-gear gear pair and the sixth-gear gear pair share the fourth-sixth shift driving gear 46a, so that the number of shift driving gears can be reduced to make the power transmission system 100 have a more compact structure.

As the shift driven gear is fitted over the corresponding output shaft, a synchronizer is provided to synchronize the shift driven gear with the corresponding output shaft, thus achieving the object of power transmission.

In some embodiments, as shown in FIGS. 1-5, the power transmission system 100 includes a first-third gear synchronizer 13c, a second-fourth gear synchronizer 24c, and a fifth-sixth gear synchronizer 56c.

In some embodiments, as shown in FIG. 1, the first-third gear synchronizer 13c is disposed on the first output shaft 21 and between the first-gear shift driven gear 1b and the third-gear shift driven gear 3b. The first-third gear synchronizer 13c may engage the first output shaft 21 with the first-gear shift driven gear 1b or the third-gear shift driven gear 3b, such that the shift driven gear may rotate together with the corresponding output shaft, e.g. the first-gear shift driven gear 1b may rotate together with the first output shaft 21, or the third-gear shift driven gear 3b may rotate together with the first output shaft 21.

In some embodiments, as shown in FIG. 1, the first-third gear synchronizer 13c includes an engaging sleeve. In some embodiments, the engaging sleeve of the first-third gear synchronizer 13c may move to the left so as to engage the third-gear shift driven gear 3b with the first output shaft 21, such that the third-gear shift driven gear 3b may rotate together with the first output shaft 21. In some embodiments, the engaging sleeve of the first-third gear synchronizer 13c may move to the right so as to engage first-gear shift driven gear 1b with the first output shaft 21, such that the first-gear shift driven gear 1b may rotate together with the first output shaft 21.

In some embodiments, as shown in FIG. 1, the second-fourth gear synchronizer 24c is disposed on the first output shaft 21 and between the second-gear shift driven gear 2b and the fourth-gear shift driven gear 4b. The second-fourth gear synchronizer 24c may engage the second-gear shift driven gear 2b with the first output shaft 21 or engage the fourth-gear shift driven gear 4b with the first output shaft 21, such that the shift driven gear may rotate together with the corresponding output shaft, e.g. the second-gear shift driven gear 2b may rotate together with the first output shaft 21, or the fourth-gear shift driven gear 4b may rotate together with the first output shaft 21.

In some embodiments, as shown in FIG. 1, the second-fourth gear synchronizer 24c includes an engaging sleeve. In some embodiments, the engaging sleeve of the second-fourth gear synchronizer 24c may move to the left so as to engage the second-gear shift driven gear 2b with the first output shaft 21, such that the second-gear shift driven gear 2b may rotate together with the first output shaft 21. In some embodiments, the engaging sleeve of the second-fourth gear synchronizer 24c may move to the right so as to engage fourth-gear shift driven gear 4b with the first output shaft 21, such that the fourth-gear shift driven gear 4b may rotate together with the first output shaft 21.

In some embodiments, as shown in FIG. 1, the fifth-sixth gear synchronizer 56c is disposed on the second output shaft 22 and between the fifth-gear shift driven gear 5b and the sixth-gear shift driven gear 6b. The fifth-sixth gear synchronizer 56c may engage the fifth-gear shift driven gear 5b with the second output shaft 22 or engage the sixth-gear shift driven gear 6b with the second output shaft 22. The fifth-sixth gear synchronizer 56c includes an engaging sleeve. In some embodiments, the engaging sleeve of the fifth-sixth gear synchronizer 56c may move to the left so as to engage the sixth-gear shift driven gear 6b with the second output shaft 22, such that the sixth-gear shift driven gear 6b may rotate together with the second output shaft 22. In some embodiments, the engaging sleeve of the fifth-sixth gear synchronizer 56c may move to the right so as to engage fifth-gear shift driven gear 5b with the second output shaft 22, such that the fifth-gear shift driven gear 5b may rotate together with the second output shaft 22.

In some embodiments of the present disclosure, the engine 4 may transmit power to, or disengage from, the first input shaft 11 and the second input shaft 12 via a dual clutch 2d.

In some embodiments of the present disclosure, as shown in FIGS. 1-5, the dual clutch 2d includes an input terminal 23d, a first output terminal 21d and a second output terminal 22d. The engine 4 is connected with the input terminal 23d of the dual clutch 2d. In some embodiments, the engine 4 is connected with the input terminal 23d by at least one selected from a group consisting of a flywheel, a damper, a torsional disk, etc.

In some embodiments, the first output terminal 21d is connected with the first input shaft 11, such that the first output terminal 21d may rotate together with the first input shaft 11. In some embodiments, the second output terminal 22d is connected with the second input shaft 12, such that the second output terminal 22d may rotate together with the second input shaft 12.

In some embodiments, the input terminal 23d may include a shell of the dual clutch 2d, and each of the first output terminal 21d and the second output terminal 22d may include one driven disk of the dual clutch 2d. In some embodiments, the shell is disengaged from the driven disk, i.e. the input terminal 23d is disengaged from the first output terminal 21d and is disengaged from the second output terminal 22d. When the shell is to be engaged with one driven disk, the shell can be controlled to engage with a corresponding driven disk, thus the shell and this driven disk may rotate together. In the present embodiment, the input terminal 23d may engage with one of the first output terminal 21d and the second output terminal 22d to transmit power from the input terminal 23d to one of the first output terminal 21d and the second output terminal 22d, to output the transmitted power.

In some embodiments, the shell may be engaged with two driven disks simultaneously. In the present embodiment, the input terminal 23d is engaged with both the first output terminal 21d and the second output terminal 22d, and thereby power from the input terminal 23d may be transmitted to the first output terminal 21d and the second output terminal 22d so as to be output.

In some embodiments, the engaging state of the dual clutch 2d may be controlled according to practical condition, and that the engaging state may also be adjusted accordingly based on a current transmission mode. In some embodiments, the input terminal 23d may disengage from the two output terminals including, for example, the first output terminal 21d and the second output terminal 22d. In some embodiments, the input terminal 23d may engage with at least one of the two output terminals including, for example, the first output terminal 21d and the second output terminal 22d.

In some embodiments, the power transmission system 100 further includes three power output shafts, i.e. a first output shaft 21, a second output shaft 22, and a motor power shaft 3. These power output shafts, a differential 75, and relationships therebetween may be described below in detail with reference to FIGS. 1-5.

In some embodiments, the differential 75 may be disposed between a pair of front wheels 76 of the vehicle. In some embodiments, the differential 75 may be disposed between a pair of rear wheels 77 of the vehicle. The differential 75 may drive the wheels to the left or to the right when the vehicle is turning or running on a rough road, such that the wheels may roll with different angular speeds, and therefore driving wheels at both sides of the vehicle may perform only rolling on the ground. In some embodiments, a shift driven gear 74 of a main reducer may be disposed on the differential 75, for example, the shift driven gear 74 may be disposed on a shell of the differential 75. In some embodiments, the shift driven gear 74 may be a bevel gear, which may not be construed as a limitation.

In some embodiments, a first output shaft gear 211 is fixed on the first output shaft 21 and may rotate together with the first output shaft 21. The first output shaft gear 211 is meshed with the shift driven gear 74 of a main reducer, such that power from the first output shaft 21 may be transmitted to the shift driven gear 74 and the differential 75 via the first output shaft gear 211.

In some embodiments, a second output shaft gear 221 is fixed on the second output shaft 22 and may rotate together with the second output shaft 22. The second output shaft gear 221 is meshed with the shift driven gear 74, such that power from the second output shaft 22 may be transmitted to the shift driven gear 74 and the differential 75 via the second output shaft gear 221.

The power transmission system 100 according to embodiments of the present disclosure may be used in various different conditions, such as a parking-charging condition (for example, charging the vehicle while the vehicle is parked), a running-charging condition (for example, charging the vehicle while the vehicle is running and both clutch parts of dual clutch 2d are engaged), and the reverse mode.

In the parking-charging condition, the engine 4 is configured to generate power and output the power to the first motor generator 51 via the second motor power shaft gear 32, thereby driving the first motor generator 51 to generate electric power.

In some embodiments, as shown in FIGS. 1-5, in the parking-charging state, that motor power shaft synchronizer 33c engages with the second motor power shaft gear 32, and the engine 4 generates power and transmits the power to the first motor generator 51 via the second input shaft 12, the six-gear gear pair, the second motor power shaft gear 32 and the motor power shaft 3 sequentially, thus driving the first motor generator 51 to generate electric power as a generator.

Therefore, charging the vehicle when the vehicle is parked may be achieved, and the number of charging modes is increased. In the parking-charging mode, the vehicle is not running, and all power from the engine 4 may be used to charge the vehicle, thus providing a fast charging performance and enhancing the charging efficiency.

In the running-charging condition, the input terminal 23d is engaged with the first output terminal 21d and engaged with the second output terminal 22d simultaneously, a part of power generated by the engine 4 may be output to one of the output shafts to drive the wheels of the vehicle, and the other part of power may be transmitted to the first motor generator 51 via the second motor power shaft gear 32, thus driving the first motor generator 51 to generate electric power.

In the running-charging condition, as shown in FIGS. 1-5, a part of power generated by the engine 4 may be transmitted to the first motor generator 51 via the second input shaft 12, the sixth-gear gear pair and the second motor power shaft gear 32 sequentially, thus driving the first motor generator 51 to generate electric power. The other part of the power generated by the engine 4 may be output via the first input shaft 11, the first-gear gear pair, the third-gear gear pair or the fifth-gear gear pair.

It is known to those skilled in the art that a conventional dual clutch generally has two gear parts, and only one gear part is used when the dual clutch is working. In the power transmission system 100 according to embodiments of the present disclosure, however, two gears parts of the dual clutch 2d may be both engaged (for example, the input terminal 23d is engaged with the first output terminal 21d and the second output terminal 22d simultaneously) when the dual clutch 2d is working. In the present embodiment, a part of power from the engine 4 may be output to wheels of the vehicle via one output shaft to drive the vehicle to run, and the other part of power from the engine 4 may be transmitted to the first motor generator 51 to drive the first motor generator 51 to generate electric power. In this way, the number of transmission modes of the vehicle is increased, and charging the vehicle while the vehicle is running may be achieved.

In the power transmission system 100 according to embodiments of the present disclosure, a mechanical reverse mode, an electric reverse mode and a hybrid (both mechanic and electric) reverse mode may be achieved.

In the mechanical reverse mode, the reverse of the vehicle is accomplished with power from the engine 4. Specifically, the engine 4 generates power and transmits the power to the reverse output gear 72 via a synchronization of reverse synchronizer 72c (synchronizing the reverse output gear 72).

In the mechanical reverse mode, as shown in FIG. 1, the power generated by the engine 4 may be transmitted to the second output shaft 22 via the second input shaft 12, the second-gear shift driving gear 2a, the first reverse idler gear 711, the second reverse idler gear 712 and the reverse output gear 72 and a synchronization of the synchronizer 72c with the reverse output gear 72.

In the mechanical reverse mode, as shown in FIG. 1, only the reverse synchronizer 72c is engaged with the reverse output gear 72.

In the electric reverse mode, the reverse of the vehicle can be enabled with power generated by the first motor generator 51. Three reverse transmission passages are provided in the electric reverse mode.

Passage 1

Power generated by the first motor generator 51 may be transmitted to output shaft with generator gear 73 via a synchronization of the reverse synchronizer 72c with the generator gear 73. Specifically, the reverse synchronizer 72c engages with the second output shaft 22 and the generator gear 73, and the power generated by the first motor generator 51 may be transmitted to the second output shaft 22 via the first motor power shaft gear 31 and the generator gear 73, so as to be output. Only the reverse synchronizer 72c engages with the generator gear 73 in this transmission passage.

Passage 2

Power generated by the first motor generator 51 may be transmitted to the output shaft with a shift driven gear via a synchronization of the motor power shaft synchronizer 33c with the second motor power shaft gear 32. Specifically, as shown in FIG. 1, the motor power shaft synchronizer 33c engages with the second motor power shaft gear 32 and the fifth-sixth gear synchronizer 56c engages with the sixth-gear shift driven gear 6b. The power generated by the first motor generator 51 may be transmitted to the second output shaft 22 via the second motor power shaft gear 32 and the sixth-gear shift driven gear 6b rotating together with the second motor power shaft gear 32, so as to be output.

Passage 3

Power generated by the first motor generator 51 may be transmitted to the reverse output gear 72 via a synchronization of the motor power shaft synchronizer 33c with the second motor power shaft gear 32, a shift driven gear and a synchronization of the reverse synchronizer 72c with the reverse output gear 72. Specifically, the motor power shaft synchronizer 33c engages with the second motor power shaft gear 32 and the reverse synchronizer 72 engages with the reverse output gear 72. The power generated by the first motor generator 51 may be transmitted to the second output gear 22 via the second motor power shaft gear 32, the sixth-gear gear pair, the second input shaft 12, the reverse idler gear 71 and the reverse output gear 72, so as to be output.

In the hybrid reverse mode, the reverse of the vehicle may be achieved with the engine 4 and the first motor generator 51. The hybrid reverse mode may be a combination of the above-mentioned mechanical reverse mode and the electric reverse mode.

In the hybrid reverse mode, the engine 4 may generate first power and transmit the first power to the reverse output gear 72 via a synchronization of the reverse synchronizer 72c with the reverse output gear 72, so as to be output.

In addition, the first motor generator 51 may generate second power and transmit the second power via the transmission passages as mentioned above. The second power generated by the first motor generator 51 may be transmitted to the reverse output gear 72 via a synchronization of the motor power shaft synchronizer 33c with the second motor power shaft gear 32, a shift driven gear and a synchronization of the reverse synchronizer 72c with the reverse output gear 72. The first power and the second power may be coupled at the second input shaft 12 and the coupled power may be transmitted to the second output shaft 22 via the reverse idler gear 71 and the reverse output gear 72.

In the hybrid reverse mode, the first motor generator 51 may adjust the speed, such that the second input shaft 12 may synchronously receive the first power from the engine 4 and the second power from the first motor generator 51, to provide a smooth and harmonious power transmission.

As described, with the power transmission system 100 according to embodiments of the present disclosure, three reverse modes including the mechanical reverse mode, the electric reverse mode, and the hybrid reverse mode may be achieved, thus increasing the number of reverse modes and facilitating a user to shift within the three reverse modes according to a practical condition. Therefore different driving requirements may be satisfied.

When the vehicle has sufficient electric power, the electric reverse mode may be used. In the electric reverse mode, harmful exhaust gases can be minimized, and the energy consumption can be reduced. It is known to those skilled in the art that, an unskilled driver will take longer time and more maneuvers to park the vehicle at a predetermined position. Considering that the engine 4 may generate more harmful gases during a low-speed reverse process and that the engine 4 has relatively higher fuel consumption, because the engine is at an uneconomical rotational speed during the reverse process, the electric reverse mode of the present disclosure is highly effective in reducing fuel consumption during such a low-speed reverse process. In addition, with the generator being used as a power source, harmful exhaust gases can be minimized, and the energy consumption in a low-speed reverse process can also be decreased. Therefore, the fuel economy of the engine 4 may be enhanced.

When the vehicle has insufficient or relatively less electric power, the mechanical reverse mode may be used. In a case that the vehicle needs to be reversed quickly or that the vehicle needs to be reversed with a larger power, the hybrid reverse mode may be used, thus enhancing the power of the vehicle and providing better driving experience to the user.

It should be noted that, the above-mentioned three reverse mode being applied in specific cases may be schematic examples provided for better understanding of the present disclosure, which may not be construed that the described reverse mode should be applied when the vehicle is in the corresponding case. In some embodiments, in a specific condition, a corresponding reverse mode may be selected according to specific requirements and a practical condition.

With the power transmission system 100 according to embodiments of the present disclosure, the number of the reverse modes of the vehicle is increased, which provides a driver more options to reverse the vehicle. In this way, the driver may be provided more driving fun, and reverse requirements of the vehicle in different road conditions may be satisfied.

In some embodiments, the power transmission system 100 further includes a second motor generator 52. With the second motor generator 52, the power of the power transmission system 100 may be improved, and more transmission modes can be provided.

In some embodiments, the second motor generator 52 may perform power transmission with the shift driven gear 74 of the main reducer. For example, a gear may be disposed on a motor shaft of the second motor generator 52, and the gear is configured to directly mesh with the shift driven gear 74 so as to perform power transmission. In some embodiments, the second motor generator 52 is configured to connect with the first input shaft 11 or the first output shaft 21. In some embodiments, the second motor generator 52 may be integral with the differential 75. In some embodiments, the engine 4 and the first motor generator 51 are configured to drive front wheels of the vehicle, and the second motor generator 52 may be a wheel-side motor and configured to drive rear wheels. In some embodiments, the second motor generator 52 may drive the pair of rear wheels via a reducing mechanism. In some embodiments, two second motor generators 52 are provided, and each second motor generator 52 is configured to drive one rear wheel via a reducing mechanism.

In some embodiments, as shown in FIGS. 2-5, the power transmission system 100 may include an electric differential lock unit. The electric differential lock unit may lock a pair of driving wheels when the vehicle is skidding, thus enhancing the antiskid performance and the pass performance of the vehicle.

In some embodiments, as shown in FIGS. 2-5, the electric differential lock unit may include a third motor generator 201, a fourth motor generator 301 and an antiskid synchronizer 503. The engine 4 and/or the first motor generator 51 are configured to drive a first pair of wheels 76, and the third motor generator 201 and the fourth motor generator 301 are configured to drive a second pair of wheels 77. The first pair of wheels 76 are one pair of the pair of front wheels and the pair of the rear wheels, and the second pair of wheels 77 are the other one pair of the pair of front wheels and the pair of the rear wheels. In some embodiments, as shown in FIGS. 5-12, the engine and the first motor generator 51 may drive the pair of front wheels, and the third motor generator 201 and the fourth motor generator 301 may drive the pair of rear wheels.

In some embodiments, as shown in FIGS. 2-5, the third motor generator 201 is configured to rotate together with one of the second pair of wheels 77. In the present embodiment, the third motor generator 201 may output power to this one wheel so as to drive this one wheel to rotate. In some embodiments, power from this one wheel may be transmitted to the third motor generator 201, thus driving the third motor generator 201 to generate electric power.

In some embodiments, the fourth motor generator 301 is configured to rotate together with the other one of the second pair of wheels 77. In the present embodiment, the fourth motor generator 301 may output power to the other one wheel so as to drive the other wheel to rotate. In some embodiments, power from the other wheel may be transmitted to the fourth motor generator 301, thus driving the fourth motor generator 301 to generate electric power. In some embodiments, as shown in FIGS. 2-5, the third motor generator 201 is configured to rotate together with a left rear wheel of the vehicle, and the fourth motor generator 301 is configured to rotate together with a right rear wheel of the vehicle. This embodiment is provided for example, and the present disclosure should not be construed to be limited by this embodiment.

In some embodiments, the antiskid synchronizer 503 is configured to selectively synchronize the second pair of wheels 77, such that the second pair of wheels 77 may rotate together. In the present embodiment, the antiskid synchronizer 503 may synchronize the second pair of wheels 77, i.e. the antiskid synchronizer 503 is in an engaged state, such that the second pair of wheels 77 may form a fixed engagement. In this way, the second pair of wheels 77 may rotate together, without rotating at different rotational speeds.

In some embodiments, when the antiskid synchronizer 503 is in a disengaged state, the third motor generator 201 and the fourth motor generator 301 may drive corresponding wheels respectively, such that the corresponding wheels may rotate at different rotational speeds. Thus the object that different wheels rotate at different speeds may be achieved. In some embodiments, when the antiskid synchronizer 503 is in a disengaged state, the third motor generator 201 and the fourth motor generator 301 may drive the second pair of wheels 77 to rotate at the same rotational speed.

With the power transmission system 100 according to embodiment of the present disclosure, the third motor generator 201 and the fourth motor generator 301 are provided and configured to drive the second pair of wheels 77 respectively, and therefore the second pair of wheels 77 rotating at different rotational speeds may be achieved. When one of the second pair of wheels 77 is skidding, the antiskid synchronizer 503 may synchronize the second pair of wheels 77 such that the second pair of wheels 77 rotate together. In this way, power output by two motors (for example, the third motor generator 201 and the fourth motor generator 301) or one motor (for example, the third motor generator 201 or the fourth motor generator 301) may be coupled to drive the second pair of wheels 77 together, thus enhancing the antiskid capability and passing performance of the vehicle.

The power transmission system 100 according to embodiments of the present disclosure includes the antiskid synchronizer 503, and therefore a mechanical self-locking differential mechanism commonly used in an axle (such as a rear axle) of a conventional power transmission system may be avoided. In addition to the functions of the antiskid synchronizer 503 itself, the function of a mechanical self-locking differential mechanism is performed by the antiskid synchronizer 503. Therefore the power transmission system 100 according to embodiments of the present disclosure may have a more compact structure and relatively lower cost.

The third motor generator 201, the fourth motor generator 301, and transmission method thereof will be described below in detail with references to FIGS. 2-5.

Figure 2:
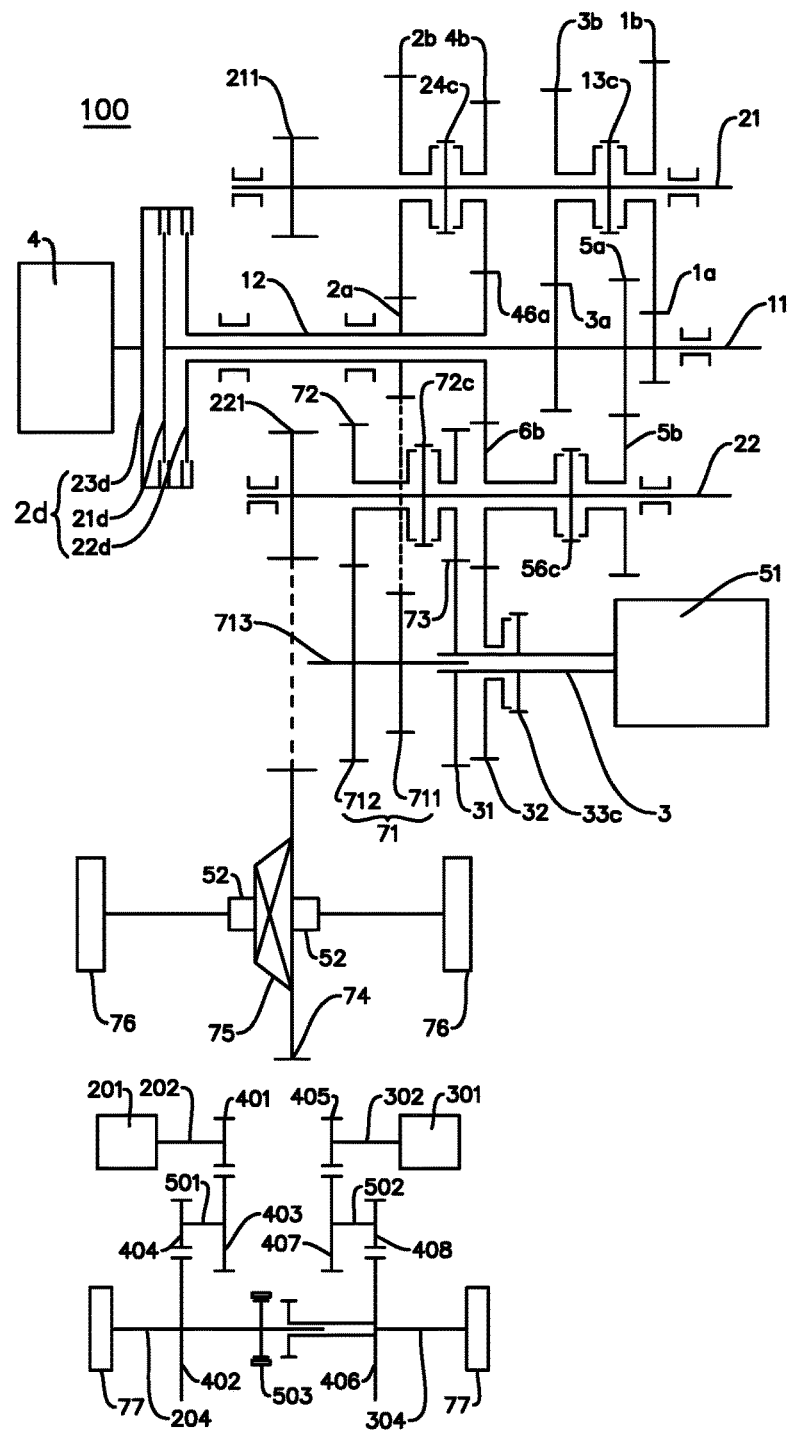
FIG. 2 is a schematic view of an exemplary power transmission system according to another embodiment of the present disclosure.
Figure 3:
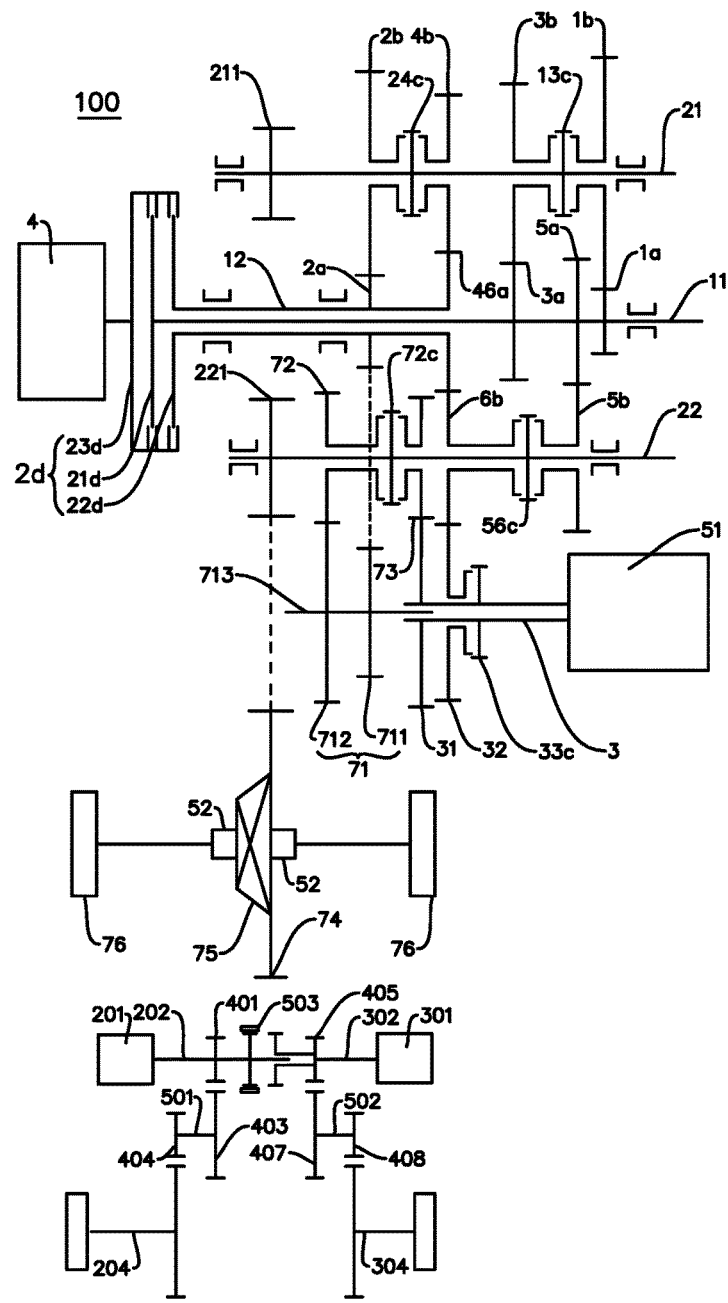
FIG. 3 is a schematic view of an exemplary power transmission system according to another embodiment of the present disclosure.
Figure 4:
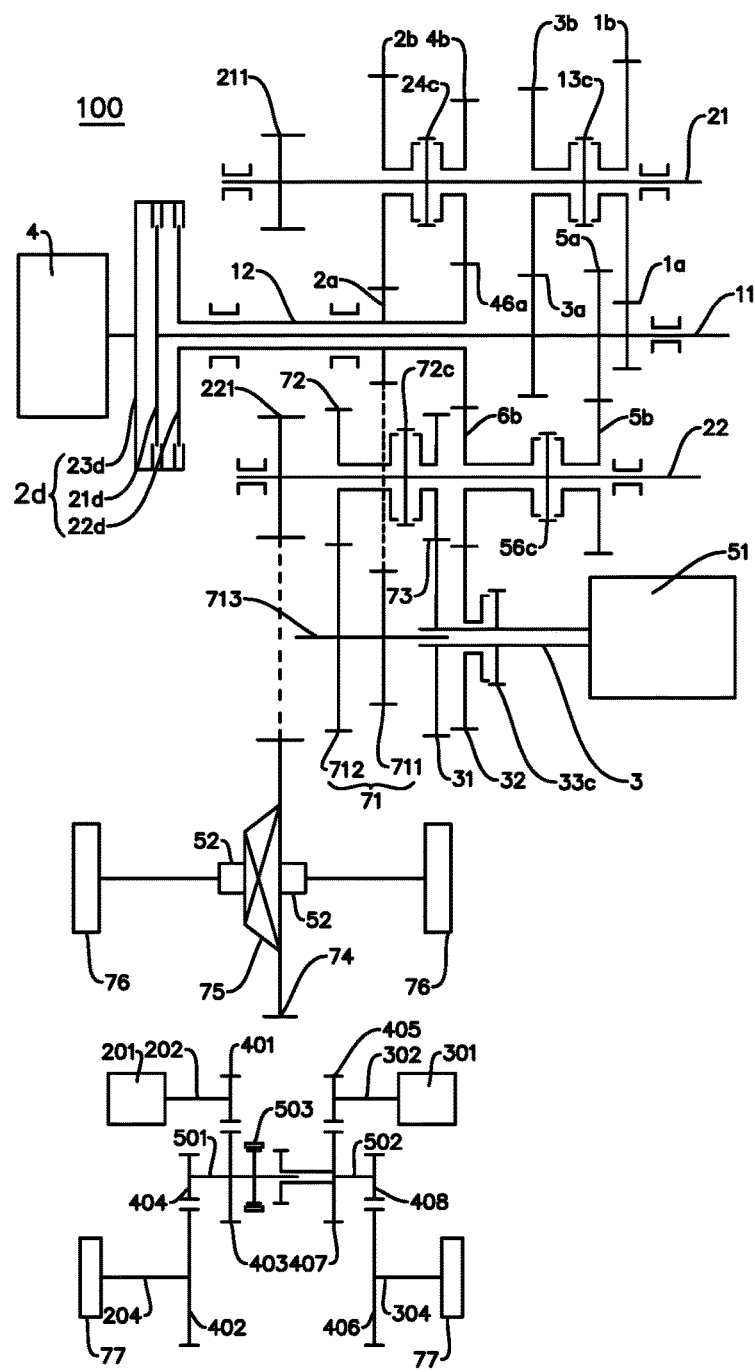
FIG. 4 is a schematic view of an exemplary power transmission system according to another embodiment of the present disclosure.

In some embodiments, as shown in FIGS. 2-4, the third motor generator 201 may perform power transmission with the corresponding wheel via a gear mechanism. In some embodiments, the fourth motor generator 301 may perform power transmission with the corresponding wheel via a gear mechanism.

The gear mechanism has simple structure and is convenient for use in power transmission. In addition, with the gear mechanism, a required transmission ratio may be obtained and the power transmission may be reliable. In some embodiments, the third motor generator 201 and the fourth motor generator 301 may perform power transmission with corresponding wheel(s) via the same gear mechanism. In the present embodiment, the gear mechanism is common, and the power transmission system 100 may be highly symmetric, thus avoiding the situation in which the center of gravity moves to one side. With one common gear mechanism, the center of gravity may be located right in the middle or substantially in the middle of the two wheels, and both the stability and reliability of the power transmission system 100 may be improved.

Figure 5:
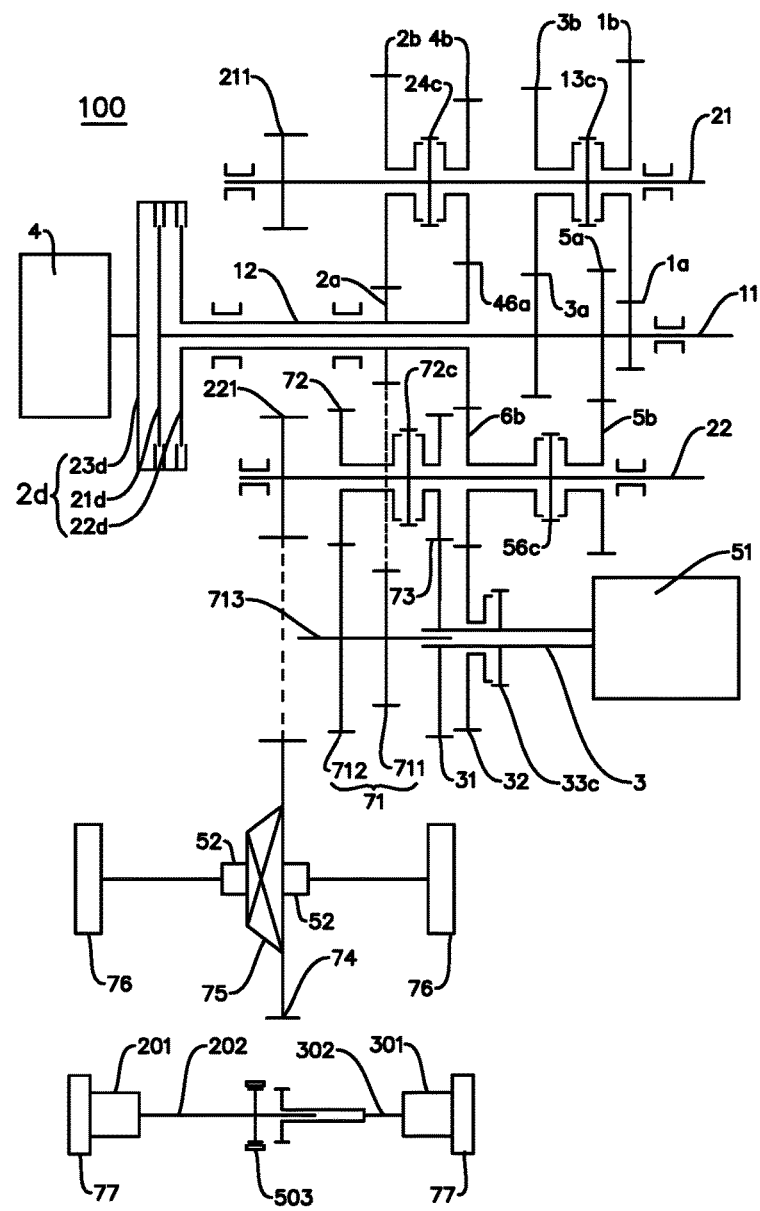
FIG. 5 is a schematic view of an exemplary power transmission system according to another embodiment of the present disclosure.

In some embodiments, as shown in FIGS. 3-5, the gear mechanism between the third motor generator 201 and the corresponding wheel may include a first gear 401, a second gear 402, a third gear 403, and a fourth gear 404.

In some embodiments, the first gear 401 may be disposed on the first output shaft 202 corresponding to the third motor generator 201, and the first gear 401 is configured to rotate together with the first output shaft 202. In some embodiments, the first output shaft 202 may output power generated by the third motor generator 201. In some embodiments, the first output shaft 202 may transmit power generated by the corresponding wheel to the third motor generator 201. In some embodiments, the first output shaft 202 and the third motor generator 201 may share the same motor shaft. In some embodiments, the motor shaft of the first output shaft 202 and the motor shaft of the third motor generator 201 may be two individual parts different from each other. In the present embodiment, the motor shaft of the first output shaft 202 and the motor shaft of the third motor generator 201 may be connected to each other.

In some embodiments, a first drive shaft 204 is connected with a wheel corresponding to the third motor generator 201, and the second gear 402 is disposed on the first drive shaft 204 and configured to rotate together with the first drive shaft 204. The third gear 403 and the first gear 401 are configured to mesh with each other, and the fourth gear 404 and the second gear 402 are configured to mesh with each other. The third gear 403 and the fourth gear 404 are coaxially arranged and may rotate together.

In some embodiments, as shown in FIGS. 2-4, the gear mechanism between the fourth motor generator 301 and the corresponding wheel may include a fifth gear 405, a sixth gear 406, a seventh gear 407, and an eighth gear 408. The fifth gear 405 may be disposed on the second output shaft 302 corresponding to the fourth motor generator 301, and the fifth gear 405 is configured to rotate together with the second output shaft 302. In some embodiments, the second output shaft 302 may output power generated by the fourth motor generator 301. In some embodiments, the second output shaft 302 may transmit power generated by the corresponding wheel to the fourth motor generator 301. In some embodiments, the second output shaft 302 and the fourth motor generator 301 may share one motor shaft. In some embodiments, the motor shaft of the second output shaft 302 and the motor shaft of the fourth motor generator 301 may be two individual parts different from each other. In the present embodiment, the motor shaft of the second output shaft 302 and the motor shaft of the fourth motor generator 301 may be connected to each other.

In some embodiments, a second drive shaft 304 is connected with a wheel corresponding to the fourth motor generator 301, and the sixth gear 406 is disposed on the second drive shaft 304 and configured to rotate together with the second drive shaft 304. The seventh gear 407 and the fifth gear 405 are configured to mesh with each other, and the eighth gear 408 and the sixth gear 406 are configured to mesh with each other. The seventh gear 407 and the eighth gear 408 are coaxially arranged and may rotate together.

In some embodiments, the first gear 401 and the fifth gear 405 may have the same structure, such as having the same size and the same teeth number. In some embodiments, the second gear 402 and the sixth gear 406 may have the same structure, such as having the same size and the same teeth number. In some embodiments, the third gear 403 and the seventh gear 407 may have the same structure, such as having the same size and the same teeth number. In some embodiments, the fourth gear 404 and the eighth gear 408 may have the same structure, such as having the same size and the same teeth number. Therefore, versatility of the gear mechanism may be improved.

In some embodiments, the third gear 403 and the fourth gear 404 may be fixed on the first gear shaft 501, and the seventh gear 407 and the eighth gear 408 may be fixed on the second gear shaft 502. In some embodiments, the third gear 403 and the fourth gear 404 may form a substantial ladder shape or a joint gear structure. In some embodiments, the seventh gear 407 and the eighth gear 408 may form a substantial ladder shape or a joint gear structure.

In some embodiments, as shown in FIG. 2, the antiskid synchronizer 503 may be disposed on the first drive shaft 204 and configured to selectively engage with the sixth gear 406. In some embodiments, a gear ring may be provided on a side of the sixth gear 406 facing the antiskid synchronizer 503, and the antiskid synchronizer 503 may include an engaging sleeve to adapt to the gear ring. With the engagement of the antiskid synchronizer 503, the second pair of wheels 77 may rotate together.

In some embodiments, as shown in FIG. 3, the antiskid synchronizer 503 may be disposed on the first output shaft 202 and configured to selectively engage with the fifth gear 405. In some embodiments, a gear ring may be provided on a side of the fifth gear 405 facing the antiskid synchronizer 503, and the antiskid synchronizer 503 may include an engaging sleeve to adapt to the gear ring. With the engagement of the antiskid synchronizer 503, the second pair of wheels 77 may rotate together.

In some embodiments, as shown in FIG. 4, the antiskid synchronizer 503 may be disposed on the first gear shaft 501 and configured to selectively engage with the seventh gear 407. In some embodiments, a gear ring may be provided on a side of the seventh gear 407 facing the antiskid synchronizer 503, and the antiskid synchronizer 503 may include an engaging sleeve to adapt to the gear ring. With the engagement of the antiskid synchronizer 503, the second pair of wheels 77 may rotate together.

In some embodiments, as shown in FIG. 5, the third motor generator 201 may be connected coaxially with a corresponding wheel, and the fourth motor generator 301 may be connected coaxially with a corresponding wheel. In some embodiments, both the third motor generator 201 and the fourth motor generator 301 may be wheel-side motors, thus shortening the transmission passage, reducing the power transmission loss and enhancing the transmission efficiency.

In some embodiments, as shown in FIG. 5, the antiskid synchronizer 503 may be disposed on the first output shaft 202 corresponding to the third motor generator 201, and configured to selectively engage with the second output shaft 302 corresponding to the fourth motor generator 301. With the engagement of the antiskid synchronizer 503, the second pair of wheels 77 may rotate together.

The power transmission system 100 and the condition the power transmission system 100 may be used will be described below with reference to FIGS. 1-5.

Embodiment 1

As shown in FIG. 1, the engine 4 is connected with the input terminal 23d of the dual clutch 2d. The first output terminal 21d of the dual clutch 2d is connected with the first input shaft 11, and the second output terminal 22d of the dual clutch 2d is connected with the second input shaft 12. The input terminal 23d may be disengaged from both the first output terminal 21d and the second output terminal 22d, or the input terminal 23d may be engaged with one of the first output terminal 21d and the second output terminal 22d, or the input terminal 23d may be engaged with both the first output terminal 21d and the second output terminal 22d.

The second input shaft 12 may be a hollow shaft, and the first input shaft 11 may be a solid shaft. The second input shaft 12 is coaxially fitted over the first input shaft 11, and a part of the first input shaft 11 extends outside of the second input shaft 12 along an axial direction of the second input shaft 12.

The first-gear shift driving gear 1a, the third-gear shift driving gear 3a and the fifth-gear shift driving gear 5a are disposed on the first input shaft 11 and configured to rotate together with the first input shaft 11. The first-gear shift driving gear 1a is positioned to the right of the fifth-gear shift driving gear 5a, and the third-gear shift driving gear 3a is positioned to the left of the fifth-gear shift driving gear 5a.

The second-gear shift driving gear 2a and the fourth-sixth-gear shift driving gear 46a are disposed on the second input shaft 12 and configured to rotate together with the second input shaft 12.

The first output shaft 21 is arranged parallel to the two input shafts, i.e. the first and second input shafts 11, 12. The first-gear shift driven gear 1b, the second-gear shift driven gear 2b, the third-gear shift driven gear 3b and the fourth-gear shift driven gear 4b are fitted over the first output shaft 21. The first-gear shift driven gear 1b is configured to mesh directly with the first-gear shift driving gear 1a, the second-gear shift driving gear 2a is configured to mesh directly with the second-gear shift driven gear 2b, the third-gear shift driving gear 3a is configured to mesh directly with the third-gear shift driven gear 3b, and the fourth-sixth-gear shift driving gear 46a is configured to mesh directly with the fourth-gear shift driven gear 4b.

The first-third gear synchronizer 13c and the second-fourth gear synchronizer 24c are disposed on the first output shaft 21. The first-third gear synchronizer 13c is positioned between the first-gear shift driven gear 1b and the third-gear shift driven gear 3b, and configured to selectively synchronize the first output shaft 21 with the first-gear shift driven gear 1b or the third-gear shift driven gear 3b. The second-fourth gear synchronizer 24c is positioned between the second-gear shift driven gear 2b and the fourth-gear shift driven gear 4b, and configured to selectively synchronize the first output shaft 21 with the second-gear shift driven gear 2b or the fourth-gear shift driven gear 4b.

The second output shaft 22 is arranged parallel to the two input shafts, i.e. the first and second input shafts 11, 12. The fifth-gear shift driven gear 5b and the sixth-gear 6b are fitted over the second output shaft 22. The fifth-gear shift driven gear 5b may mesh with the fifth-gear shift driving gear 5a directly. The sixth-gear shift driven gear 6b may mesh with the fourth-sixth-gear shift driving gear 46a directly. The fifth-sixth gear synchronizer 56c is disposed on the second output shaft 22 and is configured to synchronize the second output gear with the fifth-gear shift driven gear 5b or the sixth-gear shift driven gear 6b.

The first output shaft gear 211 is fixed on the first output shaft 21 and configured to mesh with the shift driven gear 74. The second output shaft gear 221 is fixed on the second output shaft 22 and configured to mesh with the shift driven gear 74.

The reverse output gear 72 and the generator gear 73 are fitted over the second output shaft 22. The reverse synchronizer 72c is disposed on the second output shaft 22 and between the reverse output gear 72 and the generator gear 73. The second output shaft is configured to engage with the reverse output gear 72 or the generator gear 73.

The first motor power shaft gear 31 is fixed on the motor power shaft 3 and meshed with the generator gear 73. The second motor power shaft gear 32 is fitted over the motor power shaft 3 and meshed with the six-gear shift driven gear 6b. The motor power shaft synchronizer 33c is disposed on the motor power shaft 3 and positioned near the second motor power shaft gear 32. The motor power shaft synchronizer 33c is configured to engage with the second motor power shaft gear 32.

A first reverse idler gear 711 and a second reverse idler gear 712 are fixed on a reverse shaft 713. The first reverse idler gear is meshed with the second-gear shift driving gear 2a, and the second reverse idler gear is meshed with the reverse output gear 72. The reverse shaft 713 may be solid, and a part of the reverse shaft 713 may be inserted within the motor power shaft 3 coaxially. The first motor generator 51 and the motor power shaft 3 are coaxially connected.

A condition in which the power transmission system 100 according to embodiments of the present disclosure may be used will be discussed below in detail with reference to FIG. 1.

Parking-Charging Condition

In the parking-charging condition, the motor power shaft synchronizer 33c is engaged with the second motor power shaft gear 32. Power generated by the engine 4 may be transmitted to the first motor generator 51 via the second input shaft 12, the sixth-gear gear pair, the second motor power shaft gear 32 and the motor power shaft 3, thus driving the first motor generator 51 to generate electric power.

In the parking-charging condition, charging the vehicle with a fixed velocity ratio may be achieved, and the power transmission efficiency may be increased. Those with ordinary skill in the art will appreciate that the velocity ratio relates to parameters such as the rotational speed of the engine 4 in the parking state, the type of the first motor generator 51, and maximum rotational speed acceptable by the peripheral parts such as bearings, and so on. In the present disclosure, the velocity ratio may be designed according to the above parameters and the power transmission ratio may be flexibly designed, thus making maximum use of the power from the engine 4 and achieving the object of fast charging. In the parking-charging condition, power from the engine 4 may be transmitted via a transmission passage consisting of the second input shaft 12, the sixth-gear gear pair, the second motor power shaft gear 32 and the engine 4, and therefore the object of charging with an optimal fixed velocity ratio may be achieved, and both the charging efficiency and the fuel economy of the engine are improved.

Pure Electric Condition
First Electric Condition

The reverse synchronizer 72c is engaged with the generator gear 73, and power generated by the first motor generator 51 may be transmitted to the second output shaft 22 via the first motor power shaft gear 31 and the generator gear 73, so as to be output. This transmission passage has less transmission components and higher efficacy.

Second Electric Condition

The motor power shaft synchronizer 33c is engaged with the second motor power shaft gear 32, and the fifth-sixth gear synchronizer 56c is engaged with the sixth-gear shift driven gear 6b. Power generated by the first motor generator 51 may be transmitted to the second output shaft 22 via the second motor power shaft gear 32 and the sixth-gear shift driven gear 6b, so as to be output.

Third Electric Condition

The motor power shaft synchronizer 33c is engaged with the second motor power shaft gear 32, and power generated by the first motor generator 51 may be transmitted to the second input shaft 12 via the second motor power shaft gear 32 and the sixth-gear gear pair. And then the power may be transmitted to the first output shaft 21 via the second-gear gear pair or the fourth-gear gear pair, so as to be output.

In the pure electric condition, power from the first motor generator 51 may be transmitted to wheels of the vehicle via three power transmission passages having different velocity ratios, thus driving the vehicle to run. In cases when the first motor generator 51 is used to start, to accelerate, to climb or to run, different velocity ratios may be selected accordingly to ensure that the first motor generator 51 has the highest operation efficiency.

First First-Gear Hybrid Condition

The reverse synchronizer 72 is engaged with the generator gear 73, and power generated by the first motor generator 51 is transmitted to the second output shaft 22 via the first motor power shaft gear 31 and the generator gear 73, so as to be output.

In addition, power generated by the engine 4 may be transmitted to any of the first-gear to fourth-gear gear pairs. The first power generated by the engine 4 and the second power generated by the first motor generator 51 are coupled at the shift driven gear 74, and then output to the wheels of the vehicle.

The power generated by the engine 4 may be transmitted to the fifth-gear gear pair or the sixth-gear gear pair. The first power and the second power are coupled at the second output shaft 22, and then output to the wheels of the vehicle.

In the hybrid reverse mode, the first motor generator 51 may adjust the speed, such that the shift driven gear 74 or the second output shaft 22 may synchronously receive the first power from the engine 4 and the second power from the first motor generator 51, to provide a smooth and harmonious power transmission.

First Second-Gear Hybrid Condition

The motor power shaft synchronizer 33c is engaged with the second motor power shaft gear 32, and fifth-sixth gear synchronizer 56c is engaged with the sixth-gear shift driven gear 6b. Power generated by the first motor generator 51 may be transmitted to the second output shaft 22 via the second motor power shaft gear 32 and the sixth-gear shift driven gear 6b, so as to be output. In addition, power generated by the engine 4 may be transmitted to the first output shaft 21 via the first input shaft 11, the first-gear gear pair or the third-gear gear pair. The first power generated by the engine 4 and the second power generated by the first motor generator 51 are coupled at the shift driven gear 74 of a main reducer.

The motor power shaft synchronizer 33c is engaged with the second motor power shaft gear 32, and the fifth-sixth gear synchronizer 56c is disengaged from the sixth-gear shift driven gear 6b. Power generated by first motor generator 51 may be transmitted to the second input shaft 12 via the second motor power shaft gear 32 and the sixth-gear gear pair. Power generated by the engine 4 may be transmitted to the second input shaft 12. Two parts of power are coupled at the second input shaft 12, and then transmit to the first output shaft 21 via the second-gear gear pair and the fourth-gear gear pair, so as to be output.

In the hybrid reverse mode, the first motor generator 51 may adjust the speed, such that the shift driven gear 74 or the second input shaft 12 may synchronously receive the first power from the engine 4 and the second power from the first motor generator 51, to provide a smooth and harmonious power transmission.

Two parts of power may both be transmitted to the sixth-gear shift driven gear 6b, and then the power may be transmitted to the second output shaft 22 after coupled, so as to be output. In the hybrid reverse mode, the first motor generator 51 may adjust the speed, such that the sixth-gear shift driven gear 6b may synchronously receive the first power from the engine 4 and the second power from the first motor generator 51, to provide a smooth and harmonious power transmission.

In the present disclosure, a person skilled in the art may flexibly select any of the above hybrid conditions and power transmission passages thereof according to practical requirements. With these hybrid conditions, more driving fun may be provided to the users. In addition, the vehicle may be used in different road conditions, thus enhancing both the power and the fuel economy of the vehicle.

First First-Gear Driving-Charging Condition

In the first first-gear driving-charging condition, power generated by the engine 4 may be transmitted to any of the first-gear to fourth-gear gear pairs. The reverse synchronizer 72c is engaged with the generator gear 73. Power generated by the corresponding wheel may be transmitted to the first motor generator 51 via the generator gear 73 and the first motor generator 31, thus driving the first motor generator 51 to generate electric power.

The reverse synchronizer 72c is engaged with the generator gear 73. Power generated by the engine 4 may be transmitted to the fifth-gear gear pair or the sixth-gear gear pair, and then transmitted to the second output shaft 22 via the first input shaft 11, the fifth-gear gear pair or the sixth-gear gear pair. One part of the power may be output via the second output shaft gear 221, other part of the power may be transmitted to the first motor generator 51 via the generator gear 73 and the first motor power shaft gear 31, thus diving the first motor generator to generate electric power.

The motor power shaft synchronizer 33c is engaged with the second motor power shaft gear 32. One part of power generated by the engine 4 may be transmitted to the second-gear gear pair, the fourth-gear gear pair or the sixth-gear gear pair, and the other power generated by the engine 4 may be transmitted to the first motor generator 51 via the sixth-gear gear pair and the second motor power shaft gear 32, thus driving the first motor generator 51 to generate electric power.

Power generated by the engine 4 may be transmitted via the first-gear gear pair and the third-gear gear pair. At the same time, power generated by the corresponding wheel may be transmitted to the second output shaft 22, and then transmitted to the first motor generator 51 via the six-gear shift driven gear 6b and the second motor power shaft gear 32, thus driving the first motor generator 51 to generate electric power.

First Second-Gear Driving-Charging Condition

In the first-gear driving-charging condition, one of the two gear parts of the dual clutch 2d is engaged when performing power transmission. For example, the input terminal 23d is engaged with the first output terminal 21d or engaged with the second output terminal 22d. In the third first-gear driving-charging condition, the input terminal 23d is engaged with both the first output terminal 21d and the second output terminal 22d, thus achieving a new driving-charging condition.

The motor power shaft synchronizer 33c is engaged with the second motor power shaft gear 32. A part of power generated by the engine 4 may be transmitted to the first motor generator 51 via the second input shaft 12, the sixth-gear gear pair and the second motor power shaft gear 32, thus driving the first motor generator 51 to generate electric power. The other part of the power generated by the engine 4 may be transmitted to the first output shaft 21 via the first-gear gear pair or the third-gear gear pair or transmitted to the second output shaft 22 via the fifth-gear gear pair, so as to be output.

In the present disclosure, a person skilled in the art may flexibly select any of the above hybrid conditions and power transmission passages thereof according to practical requirements. With these hybrid conditions, more driving fun may be provided to the users. In addition, the vehicle may be used in different road conditions, thus enhancing both the power and the fuel economy of the vehicle.

In the driving-charging conditions, a part of the power from the engine 4 may be transmitted via a passage consisting of the first input shaft 11, the fifth-gear gear pair, and the generator gear 73, or a passage consisting of the second input shaft 12, the sixth-gear gear pair and the generator gear 73. Therefore the object of charging with an optimal fixed velocity ratio may be achieved, and both the charging efficiency and the fuel economy of the engine 4 are improved.

Mechanical Reverse Condition

In the mechanical reverse condition, the reverse synchronizer 72c is engaged with the reverse output gear 72, such that power generated by the first motor generator 51 may be transmitted to the second output shaft 22 via the second input shaft 12, the second-gear shift driving gear 2a, the first reverse idler gear 711, the second reverse idler gear and the reverse output gear 72, so as to be output.

Electric Reverse Condition

In the electric reverse condition, the reverse synchronizer 72c may engage with the generator gear 73. The power generated by the first motor generator 51 may be transmitted to the second output shaft 22 via the first motor power shaft gear 31 and the generator gear 73, so as to be output.

In the electric reverse mode, the motor power shaft synchronizer 33c may engage with the second motor power shaft gear 32, and the fifth-sixth gear synchronizer 56c may engage with the sixth-gear shift driven gear 6b. The power generated by the first motor generator 51 may be transmitted to second output shaft 22 via the second motor power shaft gear 32 and the sixth-gear shift driven gear 6b, so as to be output.

In the electric reverse mode, the motor power shaft synchronizer 33c may engage with the second motor power shaft gear 32, and the reverse synchronizer 72c may engage with the reverse output gear 72. The power generated by the first motor generator 51 may be transmitted to the second output shaft 22 via the second motor power shaft gear 32, the sixth-gear gear pair, the second input shaft 12, the reverse idler gear 71 and the reverse output gear 72.

Hybrid (Electric-Mechanic) Reverse Condition

In the hybrid reverse mode, the motor power shaft synchronizer 33c is engaged with the second power shaft gear 32, and the reverse synchronizer 72c is engaged with reverse output gear 72. The first power generated by the engine 4 and the second power generated by the first motor generator 51 are coupled at the second input shaft 12 and then transmitted to the second output shaft 22 via the reverse idler gear 71 and the reverse output gear 72, so as to be output. In the hybrid reverse mode, the first motor generator 51 may adjust the speed, such that the shift driven gear 74 may synchronously receive the first power from the engine 4 and the second power from the first motor generator 51, to provide a smooth and harmonious power transmission.

In the parking-charging condition and the running-charging condition, the power generated by the engine 4 may be transmitted to the first motor generator 51 via the sixth-gear gear pair and the second motor power shaft gear 32 (in the running-charging condition, the power generated by the engine 4 may be transmitted to the first motor generator 51 via the generator gear 73 and the first motor power shaft gear 31). The first motor generator 51 may always rotate along the original direction of rotation (the predetermined direction of rotation such as the clockwise direction). When the first generator is regarded as the power producer, such as in the pure electric conditions and the hybrid conditions, the first motor generator 51 may always rotate along the original direction of rotation (the predetermined direction of rotation such as the clockwise direction). In the reverse conditions, the power generated by the first motor generator 51 may be output via a transmission passage consisting of the sixth-gear gear pair, the second input shaft 12, the reverse idler gear 71 and the reverse output gear 72. The first motor generator 51 may always rotate along the original direction of rotation (the predetermined direction of rotation such as the clockwise direction).

With the power transmission system 100 according to embodiments of the present disclosure, the first motor generator 51 may rotate along the predetermined direction of rotation in all the above-mentioned conditions. In other words, the first motor generator 51 may always rotate along the predetermined direction of rotation when functioning as a motor or as a generator. Even during the power transmission system 100 switching from one condition to the reverse condition, the direction of rotation of the first motor generator 51 needs not to be changed. Therefore, the first motor generator 51 may always rotate along the predetermined direction of rotation in all related conditions, such that problems of shock and interruption due to direction change of the motor may be avoided, and the life of the power transmission system 100 may be prolonged.

Embodiments 2-5

As shown in FIGS. 2-5, the power transmission system 100 in the present embodiment is substantially the same as that in the Embodiment 1, with the following exceptions that a rear-wheel driving mechanism, a third motor generator 201, a fourth motor generator 301, and an antiskid synchronizer 503 are added respectively.

Embodiment 6

As shown in FIG. 6, the power transmission system 100 in the present embodiment is substantially the same as that in the Embodiment 1, with the following exceptions that the engine 4, the dual clutch 2d, the first motor generator 51, and the differential may be avoided.

Embodiments of the present disclosure further provide a vehicle including the above-identified power transmission system 100. Other configurations such as the driving system, the turning system, and the braking system may be well-known to those skilled in the art, thus details thereof are omitted herein.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A transmission unit for a vehicle, comprising:
a plurality of input shafts, each of the input shafts having a shift driving gear thereon;
a plurality of output shafts, wherein each of the output shafts has a shift driven gear configured to mesh with a corresponding shift driving gear;
a generator gear disposed on one of the output shafts;
a motor power shaft;
a first motor power shaft gear disposed on the motor power shaft and configured to rotate together with the generator gear;
a second motor power shaft gear disposed on the motor power shaft and configured to rotate together with one of the shift driven gears;
a reverse idler gear; and
a reverse output gear configured to rotate together with one of the shift driving gears via the reverse idler gear.

2. The transmission unit according to claim 1, wherein the reverse output gear is fitted over one of the output shafts; and wherein the transmission unit further comprises a reverse synchronizer disposed on the one of the output shafts and at least configured to engage with the reverse output gear.

3. The transmission unit according to claim 2, wherein the reverse idler gear comprises: a first reverse idler gear configured to mesh with a shift driving gear; and a second reverse idler gear configured to mesh with the reverse output gear and to rotate together with the first reverse idler gear.

4. The transmission unit according to claim 3, further comprising a reverse shaft, wherein the first reverse idler gear and the second reverse idler gear are fixed on the reverse shaft.

5. The transmission unit according to claim 4, wherein the reverse shaft and the motor power shaft are coaxially arranged.

6. The transmission unit according to claim 5, wherein the motor power shaft is hollow; and wherein a part of the revere shaft is inserted into the motor power shaft.

7. The transmission unit according to claim 2, wherein the first motor power shaft gear is fixed on the motor power shaft; wherein the generator gear is fitted over one of the output shafts; and wherein the transmission unit further comprises a generator gear synchronizer disposed on one of the output shafts and configured to engage with the generator gear.

8. The transmission unit according to claim 7, wherein the generator gear and the reverse output gear share the reverse synchronizer such that the reverse synchronizer is configured as the generator gear synchronizer.

9. The transmission unit according to claim 8, wherein the second motor power shaft gear is fitted over the motor power shaft; and wherein the transmission unit further comprises a motor power shaft synchronizer disposed on the motor power shaft and configured to engage with the second motor power shaft gear.

10. The transmission unit according to claim 9, wherein the plurality of input shafts comprise a first input shaft and a second input shaft coaxially fitted over the first input shaft; and wherein the plurality of the output shafts comprise a first output shaft and a second output shaft parallel to respectively the first and second input shafts.

11. The transmission unit according to claim 10, wherein the shift driving gears on the plurality of input shafts comprise: a first-gear driving gear disposed on the first input shaft, a second-gear driving gear disposed on the second input shaft, a third-gear driving gear disposed on the first input shaft, a fifth-gear driving gear disposed on the first input shaft, and a fourth-sixth-gear driving gear disposed on the second input shaft; wherein the shift driven gears on the plurality of output shafts comprise: a first-gear driven gear, a second-gear driven gear, a third-gear driven gear, and a fourth-gear driven gear disposed on the first output shaft, a fifth-gear driven gear and a sixth-gear driven gear disposed on the second output shaft; wherein a first-third gear synchronizer disposed between the first-gear driven gear and the third-gear driven gear, a second-fourth gear synchronizer disposed between the second-gear driven gear and the fourth-gear driven gear, and a fifth-sixth gear synchronizer disposed between the fifth-gear driven gear and the sixth-gear driven gear.

12. The transmission unit according to claim 11, wherein the reverse output gear and the generator gear are both fitted over the second output shaft; wherein the reverse output gear rotates together with the second-gear driving gear via the reverse idler gear; and wherein the second motor power shaft gear meshes with the sixth-gear driven gear.

13. The transmission unit according to claim 10, wherein a first output shaft gear is fixed on the first output shaft; wherein a second output shaft gear is fixed on the second output shaft; and wherein the first output shaft gear and the second output shaft gear mesh with a shift driven gear of a main reducer respectively.

14. A power transmission system for the vehicle, comprising:
    the transmission unit according to claim 1; and
    a first motor generator configured to rotate together with the motor power shaft of the transmission unit.

15. The power transmission system according to claim 14, further comprising:
    an engine; and
    a dual clutch comprising: an input terminal connected with the engine, a first output terminal coupled with the first input shaft, and a second output terminal coupled with the second input shaft.

16. The power transmission system according to claim 15, wherein the engine is configured to engage the input terminal of the dual clutch with the first output terminal and the second output terminal of the dual clutch simultaneously to transmit a first part of power to one or more wheels via one of the plurality of output shafts, and to transmit a second part of the power to the first motor generator via the generator gear to cause the first motor generator to generate electric power.

17. The power transmission system according to claim 15, wherein the engine is configured to transmit power to the second motor power shaft gear, and to transmit the power to the first motor generator to drive the first motor generator to generate electric power, when the vehicle is in a parked state.

18. The power transmission system according to claim 15, wherein the vehicle comprises a mechanical reverse mode, an electric reverse mode and a hybrid reverse mode, wherein the engine is configured to generate first power and the first motor generator is configured to generate second power; wherein:
    when the vehicle is in the mechanical reverse mode, the engine is configured to transmit the first power to the reverse output gear via a synchronization of the reverse synchronizer;
    when the vehicle is in the electric reverse mode, the first motor generator is configured to transmit the second power to one of the plurality of output shafts with the generator gear via a synchronization of the reverse synchronizer with the generator gear;
    when the vehicle is in the electric reverse mode, the first motor generator is configured to transmit the second power to one of the plurality of output shafts with a shift driven gear via a synchronization of the motor power shaft synchronizer with the second motor power shaft gear;
    when the vehicle is in the electric reverse mode, the first motor generator is configured to transmit the second power to the shift driven gear via a synchronization of the motor power shaft synchronizer with the second motor power shaft gear and then transmit the second power to the reverse output gear via a synchronization of the reverse synchronizer with the reverse output gear; or
    when the vehicle is in the hybrid reverse mode, the engine is configured to transmit the first power to the reverse output gear via a synchronization of the reverse synchronizer with the reverse output gear, and the first motor generator is configured to transmit the second power to the shift driven gear via a synchronization of the motor power shaft synchronizer with the second motor power shaft gear, and then transmit the second power to the reverse output gear via a synchronization of the reverse synchronizer with the reverse output gear.

19. The power transmission system according to claim 15, wherein the first motor generator is configured to rotate always in a predetermined direction, when the first motor generator works as a motor or a generator.

20. The power transmission system according to claim 15, further comprising at least one second motor generator, wherein the at least one second motor generator is configured to perform power transmission with a driven gear of a main reducer of the vehicle, or is connected with the first output shaft, or is connected with the first input shaft, or wherein the at least one second motor generator comprises two second generators disposed on two sides of a differential of the vehicle, respectively, the driven gear of the main reducer is disposed on the differential.

21. The power transmission system according to claim 15, wherein the engine and/or the first motor generator is configured to drive a first pair of wheels of the vehicle, and the power transmission system further comprises:
    a third motor generator configured to rotate together with one of a second pair of wheels of the vehicle;
    a fourth motor generator configured to rotate together with the other one of the second pair of wheels of the vehicle, wherein the first pair of wheels are one pair of a pair of front wheels and a pair of rear wheels of the vehicle, and the second pair of wheels are the other pair of the pair of front wheels and the pair of rear wheels; and
    an antiskid synchronizer configured to selectively synchronize the second pair of wheels.

22. The power transmission system according to claim 21, further comprising:
    a first gear disposed on a first power output shaft corresponding to the third motor generator;
    a second gear disposed on a first drive shaft connected with a wheel corresponding to the third motor generator;
    a third gear configured to mesh with the first gear;
    a fourth gear coaxially arranged with the third gear and configured to mesh with the second gear and to rotate together with the third gear;
    a fifth gear disposed on a second power output shaft corresponding to the fourth motor generator;
    a sixth gear disposed on a second drive shaft connected with a wheel corresponding to the fifth motor generator;
    a seventh gear configured to mesh with the fifth gear; and
    an eighth gear coaxially arranged with the seventh gear and configured to mesh with the sixth gear and to rotate together with the eighth gear;

wherein the antiskid synchronizer is disposed on the first drive shaft and configured to selectively engage with the sixth gear; or the antiskid synchronizer is disposed on the first power output shaft corresponding to the third motor generator and is configured to selectively engage with the fifth gear; or the third gear and the fourth gear are fixed on a first gear shaft, the seventh gear and the eighth gear are fixed on a second gear shaft, and the antiskid synchronizer is disposed on the first gear shaft and configured to selectively engage with the seventh gear.

23. The power transmission system according to claim 21, wherein the first power output shaft is coaxially coupled with a wheel corresponding to the first output shaft, the second power output shaft is coaxially coupled with a wheel corresponding to the second output shaft, and the antiskid synchronizer is disposed on the first power output shaft and configured to engage with the second power output shaft.

24. The vehicle comprising the power transmission system according to claim 14.

* * * * *